(12) United States Patent
Xu

(10) Patent No.: US 7,010,272 B2
(45) Date of Patent: Mar. 7, 2006

(54) DOUBLE-PORT MULTI-THROUGH RF SWITCH

(75) Inventor: Xinguang Xu, Plano, TX (US)

(73) Assignee: Navini Networks, Inc., Richardson, TX (US)

(*) Notice: Subject to any disclaimer, the term of this patent is extended or adjusted under 35 U.S.C. 154(b) by 469 days.

(21) Appl. No.: 10/413,109

(22) Filed: Apr. 14, 2003

(65) Prior Publication Data

US 2004/0203550 A1   Oct. 14, 2004

(51) Int. Cl.
H04B 1/46   (2006.01)
H04B 1/44   (2006.01)
H01P 1/10   (2006.01)

(52) U.S. Cl. .......................... 455/82; 455/83; 333/101
(58) Field of Classification Search ................. 455/73, 455/78, 79–80, 82–84; 333/100, 101, 103; 370/276, 277, 278
See application file for complete search history.

(56) References Cited

U.S. PATENT DOCUMENTS

| 5,220,679 A | * | 6/1993 | Zametzer et al. ............. 455/78 |
| 5,742,212 A | * | 4/1998 | Kato et al. ................... 333/104 |
| 2002/0006810 A1 | * | 1/2002 | Schiller ...................... 455/552 |

* cited by examiner

Primary Examiner—Nguyen T. Vo
(74) Attorney, Agent, or Firm—Preston Gates & Ellis LLP

(57) ABSTRACT

An improved radio frequency (RF) switch circuit is disclosed. The RF switch is typically used in a communication system having one or more transmission paths and one or more reception paths. The RF switch has a first set of diodes connected in parallel among themselves, and a second set of diodes connected in parallel among themselves. Each diode of the second set is coupled with at least one predetermined diode in the first set in a parallel manner by sharing a connection node that is coupled further with at least one antenna. A transmitter is coupled to the first set of diodes and the receiver is separately coupled to the second set of diodes, wherein either one of the first set of diodes or the second set of diodes are activated to establish one path while cutting off all other paths at the same time.

20 Claims, 2 Drawing Sheets

DOUBLE-PORT MULTI-THROUGH RF SWITCH

BACKGROUND

The present invention relates to radio frequency hardware in general, and more particularly, to a radio frequency (RF) switch using pin diodes in wireless communication systems.

Wireless communication technologies are widely applied today throughout the world. Antenna switches are circuits which are commonly used in wireless communication devices to direct RF signals along their proper signal paths. Device components (e.g., antenna, receivers, and transmitters) of the RF system can be shared in various operations. In such an RF system, an RF switch having high linearity (i.e., high power without distortion), high speed, low insertion loss, and high isolation must be desired.

What is needed is an improved design of RF switches.

SUMMARY

An improved radio frequency (RF) switch circuit is disclosed. The RF switch is typically used in a communication system having at least a transmission path and a reception path. The RF switch has a first set of diodes connected in parallel among themselves, and a second set of diodes connected in parallel among themselves. Each diode of the second set is coupled with at least one predetermined diode in the first set in a parallel manner by sharing a connection node that is coupled further with at least one antenna. A transmitter is coupled to the first set of diodes and the receiver is separately coupled to the second set of diodes, wherein at least one of either the first set of diodes or the second set of diodes is activated to establish one transmission or reception path while cutting off the other paths at the same time. It is understood that multiple antennas, and multiple transmitters or receivers can also be connected to one diode. As such, the design can be generally understood as a N×M switch matrix wherein there are N number of ports (i.e., diodes) and M number of antennas.

The improved RF switch as described above enjoys the benefits of low insertion loss, high linearity, high isolation, and more broadband characters for the wireless communication system that the RF switch is used for.

DESCRIPTION

The present disclosure provides an improved design for a radio frequency (RF) switch circuit. The RF switch is typically used in a wireless communication system in which multi-band/multi-function communication devices (e.g., transmitters or receivers) may select two or more antennas for use. The device activation/selection time or antenna selection time can be as short as several nanoseconds. On the other hand, the range of signal power passing through the antenna could be higher than 130 dB.

The examples of the present disclosure are explained below in the context of a Time Division Duplex (TDD) system for wireless communication, but it is understood that similar designs can be used for a system using similar technologies. Traditionally in a TDD system, a Double-Port Multi-Through (DPMT) switch is situated between a receiver and transmitter (T/R) module and the multi-antennas of the communication system.

Figure 1:
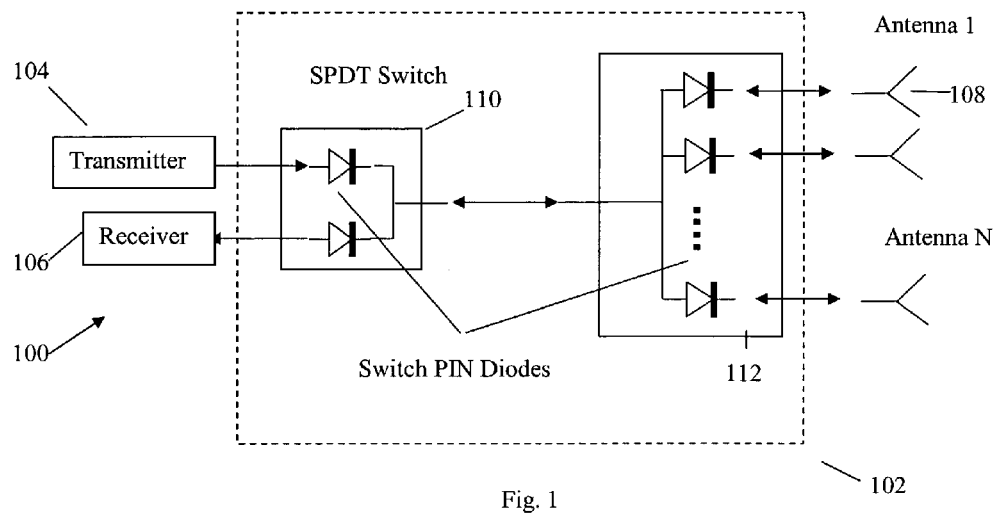
FIG. 1 illustrates a traditional design of a switch circuit using a DPMT switch.

FIG. 1 illustrates a traditional design of a switch circuit 100 using a DPMT switch 102. The DPMT switch 102 is connected to a transmitter 104 and a receiver 106 on one end, and connected to multiple antennas 108 on the other end. The DPMT switch 102 itself consists of two major sub-modules, one is a Single Port Double Through (SPDT) switch 110, and the other is a Single Port Multiple Through (SPMT) switch 112. The connection between the SPDT switch 110 and the SPMT switch 112 is known as a simple serial connection. It can be appreciated by one skilled in the art, that as the transmission and reception of wireless communications do not happen at the same time, the transmission path and the reception path of the switch circuit do not interfere with each other much.

Figure 2:
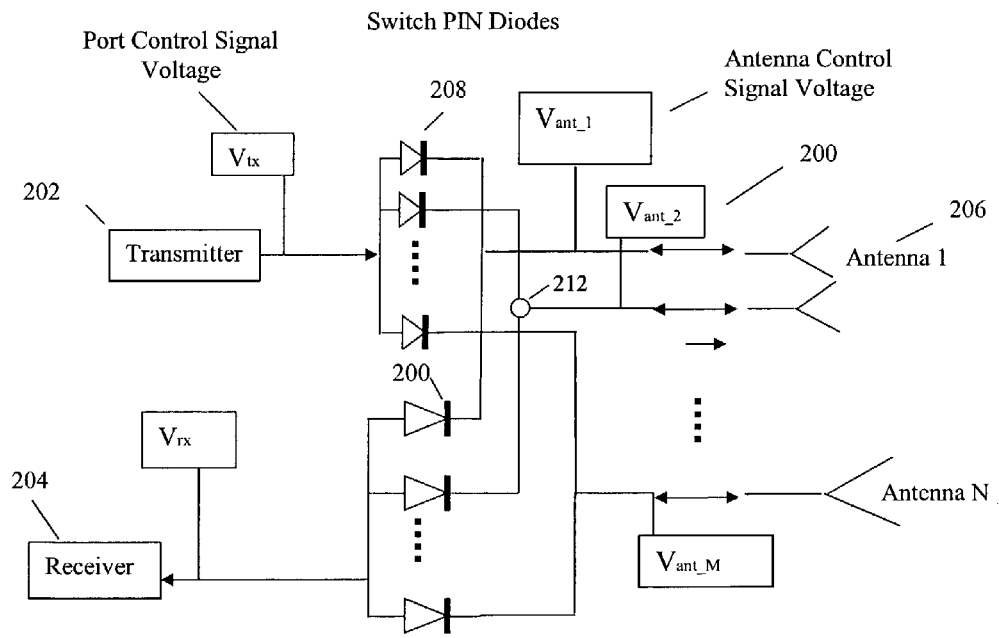
FIG. 2 illustrates an improved design of a switch circuit according to one example of the present disclosure.

FIG. 2 illustrates an improved design of a switch circuit 200 according to one example of the present disclosure. Unlike the traditional design as illustrated in FIG. 1, the serial connection is now replaced by a parallel connection between pin diodes. The circuit still connects to a transmitter 202 and a receiver 204 on one end, and the antennas 206 on the other. However, a first set of pin diodes 208 are connected in parallel among themselves and connect in a serial manner with the transmitter 202 and the antennas 206. Similarly, there is a second set of pin diodes 210 that are connected in a parallel fashion among themselves for the reception path as shown in FIG. 2. Further, in one example, a particular pin diode 208 connecting to a predetermined antenna 206 on the transmission path is further connected to a corresponding pin diode 210 in the reception path sharing a common connection node 212. As such, for each antenna, there will be two pin diodes connected thereto, and depending on whether it is a transmission mode or receiving mode, either the transmission path or the reception path will be turned on while the other is deactivated. The activation or deactivation of these two paths can be controlled by transmitter and receiver port control voltages, $V_{tx}$ and $V_{rx}$ respectively (collectively referred to as port control voltages), and antenna control voltages $V_{ant1}$ through $V_{antm}$. When the port control voltages and the antenna control voltages are appropriately controlled, the pin diodes are forward biased, thereby only activating either the transmission path or the reception path.

Further, by asserting different voltage values on the different antenna control voltages, the system can control which antenna will be transmitting or receiving the signals. Taking the design in FIG. 2 for example, when the transmission path is intended to be activated, the $V_{tx}$ may be set at a high voltage such as 5V, and $V_{ant}$ for one or more antennas that are set at a lower value such as 3V. This causes the pin diodes coupled to the transmitter to be forward biased and the signals are passed from the transmitter to the selected antennas. At the same time, $V_{rx}$ is set at a lower value such as 0V so that the pin diodes coupled to the receiver are cut off because the diodes are in the reverse bias mode, thereby blocking the reception path. It is noted that $V_{ant}$ is set at a voltage value low enough to keep one diode of the first set of diodes connected to the transmitter activated, but high enough to turn off the corresponding pin diode in the second set of diodes connected to the receiver. It is further noted that to make the diodes clearly switch on and off, the pin diodes are put in the forward bias mode by having the anode side voltage higher than that of the cathode side over a predetermined threshold. As it is known in the industry, 0.7V is the minimum required threshold, but a bigger difference will make the switching character better. Similarly, in order to completely turn the deactivated diodes off, the voltage on the cathode side of the deactivated diodes are preferred to be as high as the design allows. Further, as the antenna is individually controlled by imposing different antenna control voltages, another control module may be integrated in the system (not shown) just for controlling which antenna is selected to be used for communications.

Similarly, when the reception path is intended to be activated, one of the pin diodes coupled to the receiver can be forward biased by imposing a low antenna control voltage and a high receiver port control voltage, while the transmitter port control voltage is also set at a low level in order to cut off the transmission path.

Figure 3:
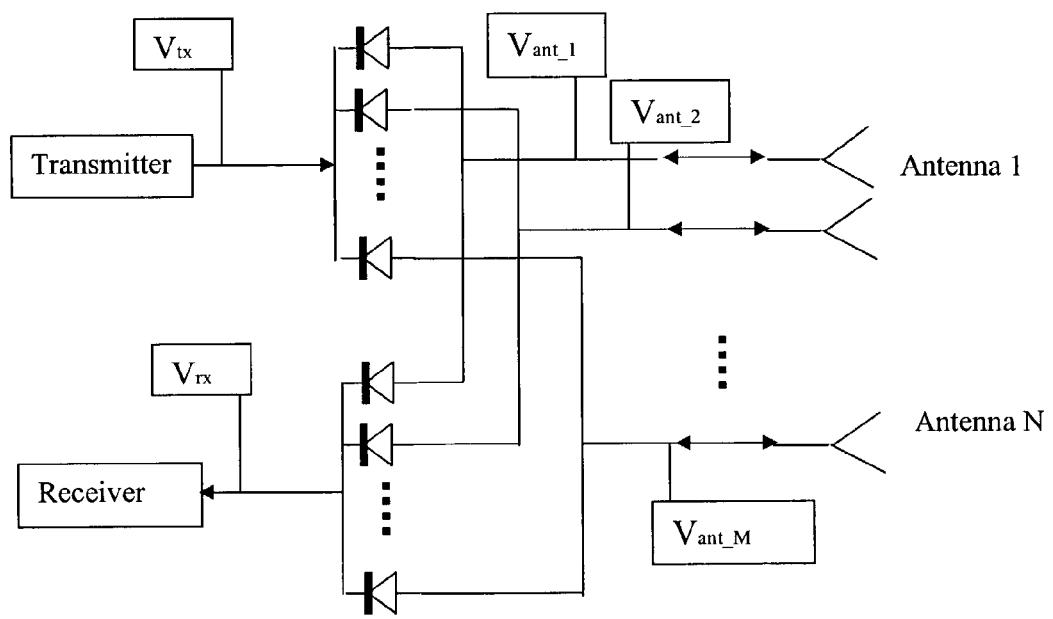
FIG. 3 illustrates an improved design of a switch circuit according to another example of the present disclosure.

FIG. 3 illustrates another example of the present disclosure which is very similar to the layout illustrated in FIG. 2 except that all the pin diodes are connected in a reversed manner. This example is based on the functional nature of pin diodes in an RF switch, wherein the diodes will always pass the signals in the forward bias mode. By controlling the transmitter and receiver port control voltages along with the antenna control voltages, one skilled in the art can appreciate that the two sets of diodes can be appropriately controlled to be either in the forward or reverse bias mode, thereby activating either the transmission path or the reception path while cutting off the other. Moreover, as more than one transmitters or receivers may be connected to the RF switch through a selection mechanism, the individual transmitter/receiver can also be activated by imposing a predetermined port control voltage, while other ports turned off for other transmitters/receivers. These multiple transmitters or receivers may use different frequency bands for their communication purposes.

In order to improve the linearity of this improved RF switch, the voltages imposed on the cathode side of the deactivated diodes are preferred to be as high as the design allows so that the diodes are completely cut off from passing another interfering signals. It is also understood that although the voltage values of 3V and 5V are standard voltages used in many designs, other voltages can also be used such as 4V and 6V. The goal is to impose a sufficient voltage difference between the two ends of a selected pin diode so that it can be put in the forward bias mode for passing the RF signals through, while, at the same time, cutting off the undesired paths by deactivating other pin diodes.

Although the examples illustrated in FIG. 2 or 3 provide a one-to-one relation between the port and the antenna for either a transmission or reception path, it is understood that it does not have to be so. In some other examples, multiple antennas can be connected to one pin diode. As such, the design can generally be understood as a N×M switch matrix wherein there are N number of ports (i.e., pin diodes) and M number of antennas for constructing signal paths.

The improved RF switch as described above enjoys the benefits of low insertion loss, high linearity, high isolation, and more broadband characters for the wireless communication system that the RF switch is used for.

The above disclosure provides several different embodiments, or examples, for implementing different features of the disclosure. Also, specific examples of components, and processes are described to help clarify the disclosure. These are, of course, merely examples and are not intended to limit the disclosure from that described in the claims.

While the disclosure has been particularly shown and described with reference to the preferred embodiment thereof, it will be understood by those skilled in the art that various changes in form and detail may be made therein without departing from the spirit and scope of the disclosure.

What is claimed is:

1. A radio frequency (RF) switch circuit used in a communication system having one or more transmission paths and one or more reception paths, comprising:
   a first set of diodes connected in parallel among themselves and coupled to a transmitter; and
   a second set of diodes connected in parallel among themselves and coupled to a receiver, each diode of the second set being coupled with at least one predetermined diode in the first set in a parallel manner by sharing a connection node that is coupled with at least one antenna,
   wherein at least one of either the first set of diodes or the second set of diodes is activated to establish one transmission or reception path while cutting off all other paths at the same time.

2. The RF switch circuit of claim 1 further includes a first port control voltage coupled between the transmitter and the first set of diodes.

3. The RF switch circuit of claim 1 further includes a second port control voltage coupled between the receiver and the second set of diodes.

4. The RF switch circuit of claim 1 further comprises an antenna control voltage coupled between the connection node and the antenna for selecting the antenna to be used for the activated transmission or reception path.

5. The RF switch circuit of claim 1 wherein the diodes are activated by being put in a forward bias mode.

6. The RF switch circuit of claim 1 wherein the diodes that are not activated has a voltage difference as high as allowed.

7. A radio frequency (RF) switch matrix used in communication systems for providing at least one transmission path passing RF signals from at least one transmitter to at least one antenna, and at least one reception path for receiving the RF signals from at least one antenna to at least one receiver, comprising:
   a first set of diodes connected in parallel among themselves and coupled to the transmitter and a transmitter control voltage circuit; and
   a second set of diodes connected in parallel among themselves and coupled to the receiver and a receiver control voltage circuit, each diode of the second set being coupled with at least one predetermined diode in the first set in a parallel manner by sharing a connection node that is coupled with one or more antennas;
   an antenna control voltage circuit coupled to each antenna,
   wherein at least one of the first set of diodes or the second set of diodes is activated to establish one transmission or reception path while cutting off the other paths at the same time by controlling the transmitter control voltage circuit, the receiver control voltage circuit and the antenna control voltage circuit.

8. The RF switch matrix of claim 7 wherein the antenna is individually activated by controlling the antenna control voltage circuit.

9. The RF switch matrix of claim 7 wherein the diodes are activated by being put in a forward bias mode.

10. The RF switch matrix of claim 7 wherein the transmitter control voltage circuit, the receiver control voltage circuit and the antenna control voltage circuit are controlled in such a way that voltages imposed allows only one antenna to be selected for communications while other communication paths are all deactivated.

11. The RF switch matrix of claim 7 wherein the transmitter control voltage circuit, the receiver control voltage circuit and the antenna control voltage circuit are controlled in such a way that the voltage difference between an anode side and a cathode side of a selected diode is high enough to activate the diode to provide a communication path to a selected antenna while the voltage difference between the anode side and the cathode side of all other deactivated diodes are low enough to cut off any other communication path.

12. The RF switch matrix of claim 11 wherein one or more voltages imposed on the cathode side of the deactivated diodes are designed to be as high as allowed by the RF switch matrix comparing to those on the anode side so that the diodes are completely deactivated.

13. The RF switch matrix of claim 7 further comprising each transmitter uses a frequency band different from that of another connected to the RF switch matrix.

14. The RF switch matrix of claim 7 further comprising each receiver uses a frequency band different from that of another connected to the RF switch matrix.

15. A method for controlling radio frequency (RF) switch matrix used in communication systems for providing one or more transmission paths passing RF signals from one or more transmitters to at least one antenna, and one or more reception paths for receiving the RF signals from at least one antenna to one or more receivers, comprising:

imposing a transmitter control voltage to a first end of a first set of diodes, the first set of diodes being connected in parallel among themselves and coupled to the transmitters on the first end; and imposing a receiver control voltage to a first end of a second set of diodes, the second set of diodes being connected in parallel among themselves and coupled to the receivers on the first end, each diode of the second set being coupled with at least one predetermined diode in the first set in a parallel manner by sharing a connection node that is coupled with one or more antennas;

imposing one or more antenna control voltages at the second end of first and second set of diodes, wherein at least one of either the first set of diodes or the second set of diodes is activated to establish one transmission or reception path for passing communication signals through a selected antenna while cutting off all other paths at the same time by the imposed transmitter control voltage, receiver control voltage and antenna control voltage.

16. The method of claim 15 wherein the antenna is individually activated by controlling an associated antenna control voltage.

17. The method of claim 15 further comprising activating the diode in either the first or second set of diodes by putting it in a forward bias mode through the imposed transmitter control voltage, receiver control voltage and antenna control voltage.

18. The method of claim 17 wherein cutting off all other paths further includes putting the diodes in a reverse bias mode.

19. The method of claim 15 wherein the transmitters use multiple frequency bands.

20. The method of claim 15 wherein the receivers use multiple frequency bands.

* * * * *